No. 627,004. Patented June 13, 1899.
S. N. MAXWELL.
WAGON BODY RAISER.
(Application filed Mar. 1, 1899.)
(No Model.)

WITNESSES:
Jos. A. Ryan
Edw. M. Byrn.

INVENTOR
Samuel N. Maxwell
BY Munn & Co.
ATTORNEYS.

UNITED STATES PATENT OFFICE.

SAMUEL NEWTON MAXWELL, OF GROVE, INDIAN TERRITORY.

WAGON-BODY RAISER.

SPECIFICATION forming part of Letters Patent No. 627,004, dated June 13, 1899.

Application filed March 1, 1899. Serial No. 707,339. (No model.)

*To all whom it may concern:*

Be it known that I, SAMUEL NEWTON MAXWELL, of Grove, Cherokee Nation, Indian Territory, have invented a new and useful Improvement in Wagon-Body Raisers, of which the following is a specification.

The object of my invention is to provide a simple, cheap, and practical means for the use of farmers and others, whereby a wagon-body may be conveniently lifted off the running-gear when the latter is desired for other uses, such as for rough work not requiring the box or body portion, which body part is to be held suspended in convenient position to be again applied to the running-gear when wanted. It is designed to be of such construction that it may be erected by any farmer by simply buying two pulleys and a winding-shaft or windlass and is arranged for such leverage or power that very little effort is required to do the work, so that even a boy may operate it.

It consists in the peculiar construction and arrangement of parts, which I will now proceed to describe with reference to the accompanying drawings, in which—

Figure 1:
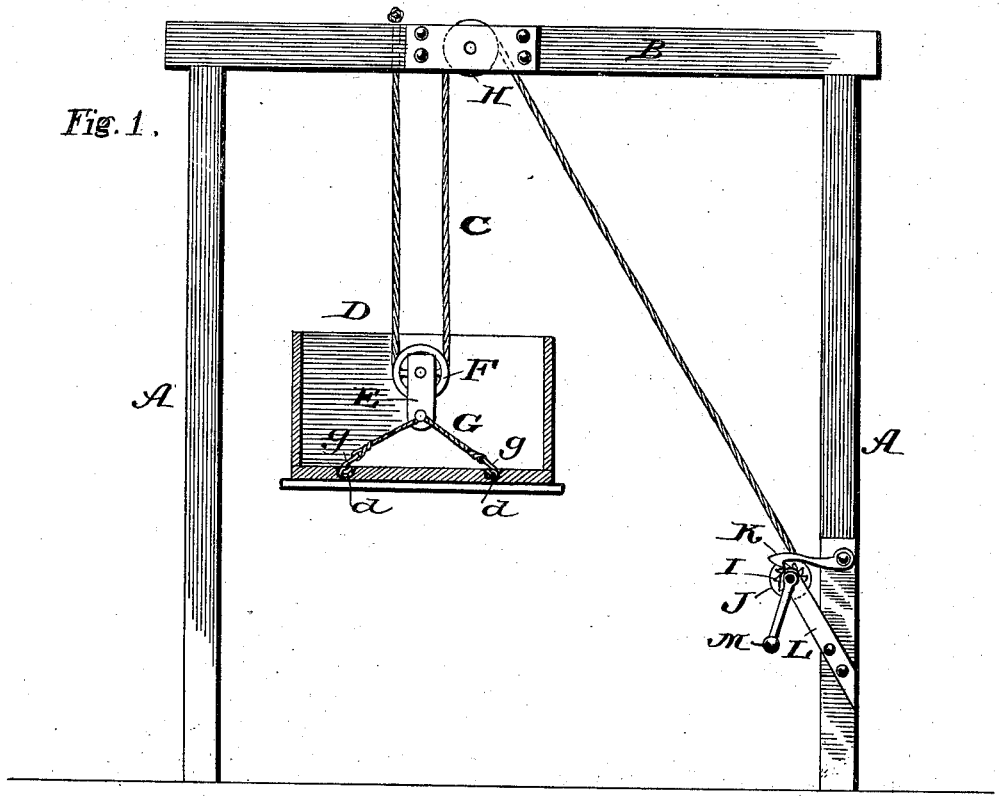
Figure 2:
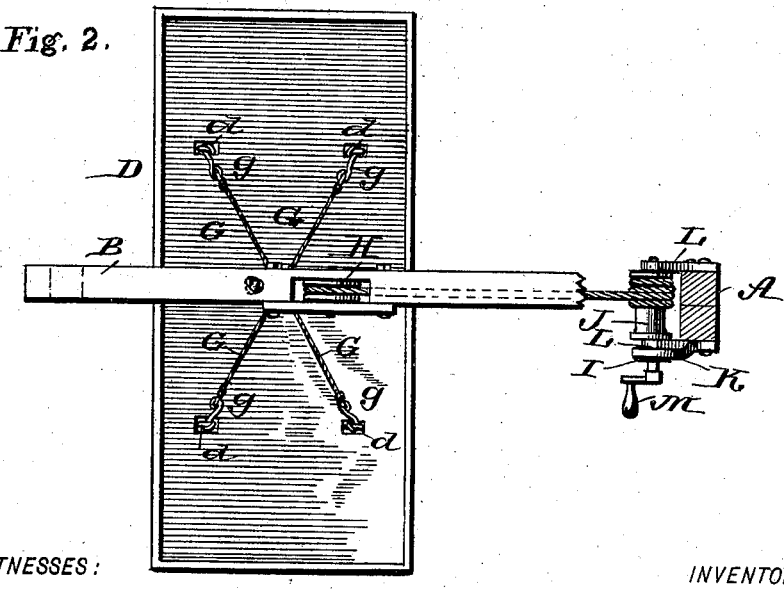

Figure 1 is a side elevation of my wagon-body raiser with a wagon-body, shown in section as suspended in elevated position. Fig. 2 is a plan or top view, partly in section.

In the drawings, A A represent two vertical posts, the lower ends of which are embedded in the ground or tenoned into the floor-timbers of a barn or shed.

B is a horizontal cross-beam connecting the tops of the two posts A A.

C is the lifting-rope, one end of which is securely fastened to the cross-beam B. This rope passes first around a movable pulley F, which lies in the bight or loop of the rope, and then extends upwardly to and around a stationary pulley H, journaled in the cross-beam B, and thence descends to and is wound around a windlass or drum J. This windlass is journaled in bearings in arms L L, attached to and offsetting from one of the posts A in an upwardly-inclined position—that is to say, with their outer or free ends pointing upwardly toward the stationary pulley H and in line with the rope, so that these windlass-supports may be made of simple arms without expense of bracing and still not be liable to break off or become loosened by the strain of the rope, which is in the line of the longitudinal axis of the arms. The windlass is provided with a suitable turning-crank M and has a rigidly-attached ratchet-wheel I at one end, with which a pawl or detent K is arranged to engage to hold the windlass to its place after the rope is wound up.

To the pulley F is attached a sling composed of a block E, having four ropes G G G G attached to it and terminating at their ends in hooks $g\ g\ g\ g$. These hooks are arranged to be engaged with four staples $d\ d\ d\ d$, distributed equally about the center of gravity of the wagon-body D, which staples are placed in recesses in the bottom of the wagon below the floor-level, so that they afford no obstruction to the smooth even surface of the floor of the wagon-body.

To raise a wagon-body, the wagon is run between the posts A A and the pawl thrown out of the ratchet-wheel on the windlass. The pulley F and its sling E G are then drawn down and the hooks $g\ g\ g\ g$ of the sling secured to the staples in the bottom of the wagon-body. The pawl is then thrown into the ratchet again and the windlass is turned by its crank to wind up the rope, and as the rope is wound up the pulley F in the bight of the rope rises as the rope shortens and the wagon-body is raised to the desired height with the expenditure of very little power and is maintained by the pawl at its elevated position, where it is out of the way and remains until wanted again on the wagon. To apply it to the wagon, it is only necessary to run the wagon under the body, loosen the pawl, and by holding the windlass-crank allow the rope to unwind and the wagon-body to descend upon the running-gear.

I am aware that ropes and pulleys and windlasses in more or less complicated organization have heretofore been combined for the same purpose as my invention, and I therefore only claim my peculiar construction and arrangement of devices, the distinctive features of which are the construction of the sling and its combination with the sunken staples in the bottom of the wagon-body, whereby the sides of the wagon-body extend above the sling, and with a limited height of beam B the wagon-body may be raised higher.

Another feature of my invention also is the upwardly-inclined windlass-arms, arranged in alinement with the rope and combined with the pulleys, rope, and sling.

Having thus described my invention, what I claim as new, and desire to secure by Letters Patent, is—

A wagon-body raiser consisting of two vertical posts A A having cross-beam B at the top, a stationary pulley H mounted on the cross-beam, the rope C attached at one end to the cross-beam falling in a bight and then passing around the stationary pulley, a movable pulley F arranged in the bight of the rope and having a suspended block E and rope-slings G with terminal hooks $g$, adapted to engage staples sunken below the level of the wagon-body floor, the arms L L attached to one of the posts A in inclined position and in substantial alinement with the rope, and a windlass with ratchet, pawl, and crank, mounted in bearings in said arms substantially as and for the purpose described.

SAMUEL NEWTON MAXWELL.

Witnesses:
JOHN W. DEASOR,
JOSEPH E. DIBBLE.